United States Patent

[19]

Preus

[11] 4,037,416

[45] July 26, 1977

[54] CABLE CONNECTOR ASSEMBLY FOR OIL BOOM

[76] Inventor: Paul Preus, Smith Road, Toms River, N.J. 08753

[21] Appl. No.: 687,215

[22] Filed: May 17, 1976

[51] Int. Cl.$^2$ .............................................. E02B 15/04
[52] U.S. Cl. ........................................ 61/1 F; 114/253
[58] Field of Search ............ 61/1 F, 5; 210/DIG. 21; 114/253

[56] References Cited

U.S. PATENT DOCUMENTS

| | | | |
|---|---|---|---|
| 3,756,031 | 9/1973 | Smith et al. ............................ | 61/1 R |
| 3,849,989 | 11/1974 | Preus ....................................... | 61/1R |
| 3,922,862 | 12/1975 | Vidilles .................................. | 61/1 R |

Primary Examiner—Paul R. Gilliam
Assistant Examiner—Alex Grosz
Attorney, Agent, or Firm—Harold L. Stowell

[57] ABSTRACT

A barrier for water carried pollutants consists of a series of end to end connected boom sections with each boom section including a tubular sleeve portion containing flotation means and a depending skirt. The entire series of boom sections are connected to one or a pair of flexible draft members which are connected to the booms at spaced points by connector assemblies comprising this invention.

2 Claims, 3 Drawing Figures

CABLE CONNECTOR ASSEMBLY FOR OIL BOOM

CROSS-REFERENCE TO RELATED APPLICATIONS

Related subject matter is disclosed and claimed in my co-pending applications, Ser. No. 676,795 filed Apr. 14, 1976 and Ser. No. 676,794 filed Apr. 14, 1976, now U.S. Pat. No. 3,998,060.

BACKGROUND OF THE INVENTION

Field of the Invention

Floating barriers, known generally as oil booms, have been found to have great utility in containing and controlling oil slicks on bodies of water. The barriers usually include flotation elements having a depending liquid impervious skirt which, when deployed around or in a controlling position relative to oil floating on water, provide means to contain or prevent the oil from spreading or moving into areas protected by the barrier.

Present art barriers generally utilize another solid material as the flotation medium or gas inflatable flotation elements.

It is also known, as disclosed in my co-pending application, Ser. No. 683,189 filed May 4, 1976 to provide control wires, chains or the like on either one or both sides of the oil boom to maintain the integrity of the boom and to provide means whereby the configuration of the boom may be maintained by connecting to the control wires additional cables, chains or the like, which additional cables or chains may be connected to other booms, the shore, a wreck, a boat or boats, or to sea or bottom anchors or any combination thereof.

SUMMARY OF THE INVENTION

The invention may be generally defined as a barrier for water carried pollutants comprising a series of end to end connectable boom sections, each boom section comprising a flexible tubular sleeve containing flotation means and a depending skirt, flexible draft members extending along each side of the skirt immediately below the tubular sleeve and means connecting the flexible draft member to the skirt at spaced intervals, characterized in that the connecting means comprise a pair of rigid plates, one of said pair of plates being positioned on one face of said skirt and the other of said pair of plates being positioned on the opposite face of said skirt, means rigidly joining said pair of plates through the skirt, and an anchor shackle secured to the outer face of each of the pair of plates.

The invention will become more apparent to those skilled in the art by reference to the following detailed description when viewed in light of the accompanying drawing.

DETAILED DESCRIPTION OF PREFERRED EMBODIMENT

Figure 1:
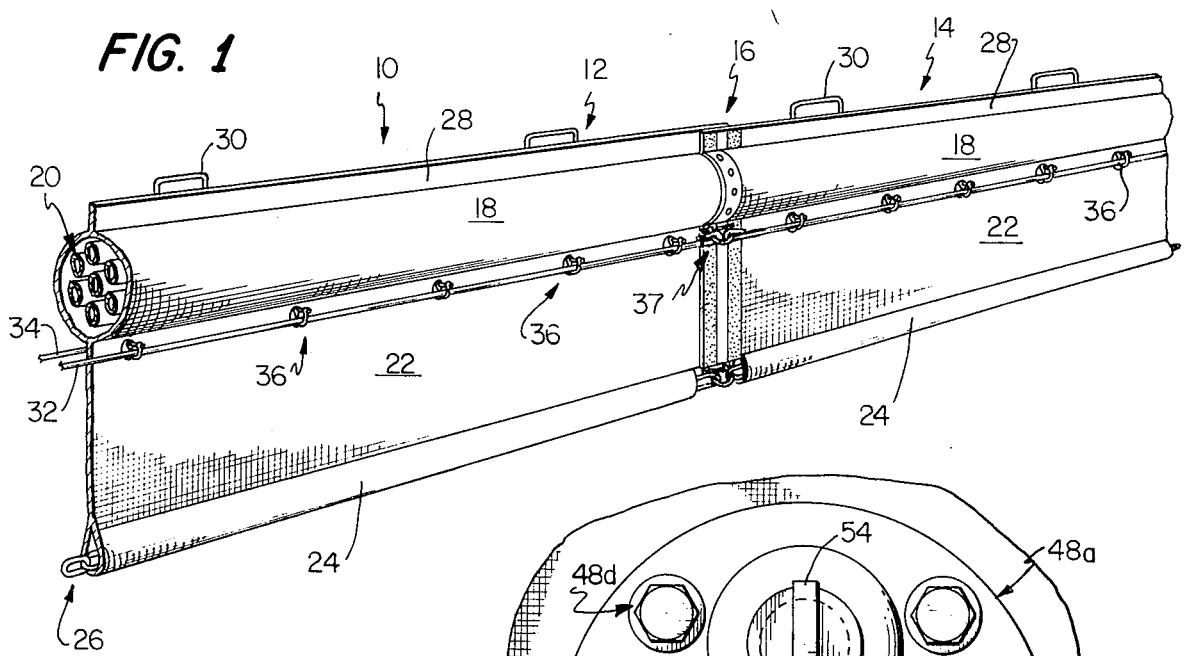
FIG. 1 is a fragmentary perspective view of a oil boom embodying the principles of the present invention.

Referring to the drawing, 10 generally designates an oil containing boom of the type adapted to surround an oil spill or the like floating on the surface of a body of water. The containment boom may also be stretched across all or a portion of rivers, streams and the like or connected down current of a submerged or partially submerged vessel having oil or other floating contaminants issuing therefrom, all as is known in the art.

The boom 10, illustrated in FIG. 1 of the drawing, comprises two boom sections 12 and 14 interconnected at a joint generally designated 16. Each boom section 12 and 14 includes a tubular portion 18 containing flotation means which in the illustrated form of the invention comprises seven air-inflatable elongated tubes generally designated 20 of the type disclosed in my application Ser. No. 676,795 filed Apr. 14, 1976. Depending from the tubular portions 18 are skirt members 22 and at the lower end of each skirt is a longitudinal pocket 24 containing a ballast chain 26. Each of the booms 12 and 14 may also include an upstanding fin 28 and spaced along the fin 28 are a plurality of handles 30, which handles assist in deploying and retrieving the boom sections. Further, the handles are very useful in storing the boom sections as the handles may be merely slipped over pegs spaced at least a pair of handles distance or multiples thereof. The handles have also been found to be helpful in cleaning the boom sections prior to reuse as the handles may be hung over hooks movably positioned over a scrub tank.

Each tubular sleeve portion 18 may have a length of, for example, 50 feet and a diameter of, for example, 8 inches. However, the boom sections may have lengths of from 2 feet to 100 feet and diameters in the range of from 6 inches to as much as 36 inches, for example. The tubular sleeve and the skirt may be constructed of, for example, nylon reinforced PVC sheet material, nylon reinforced oil-resistant rubber, fabric and the like.

The assembly also includes a pair of flexible draft members 32 and 34 strung along each side of the skirt members 22 just below the tubular portions 18. The flexible draft members may comprise cables, chains or the like and the flexible draft members are maintained in the desired position by improved connectors generally designated 36.

Figure 2:
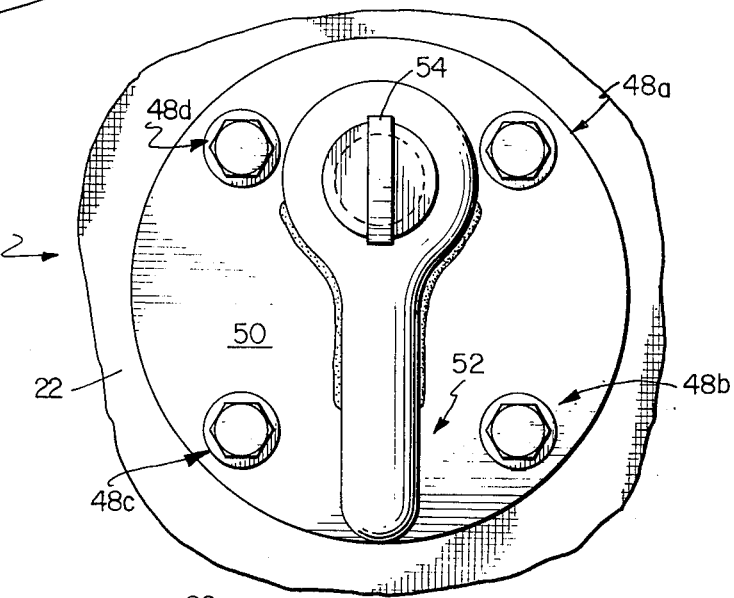
FIG. 2 is an enlarged plan view of a connector of the invention.
Figure 3:
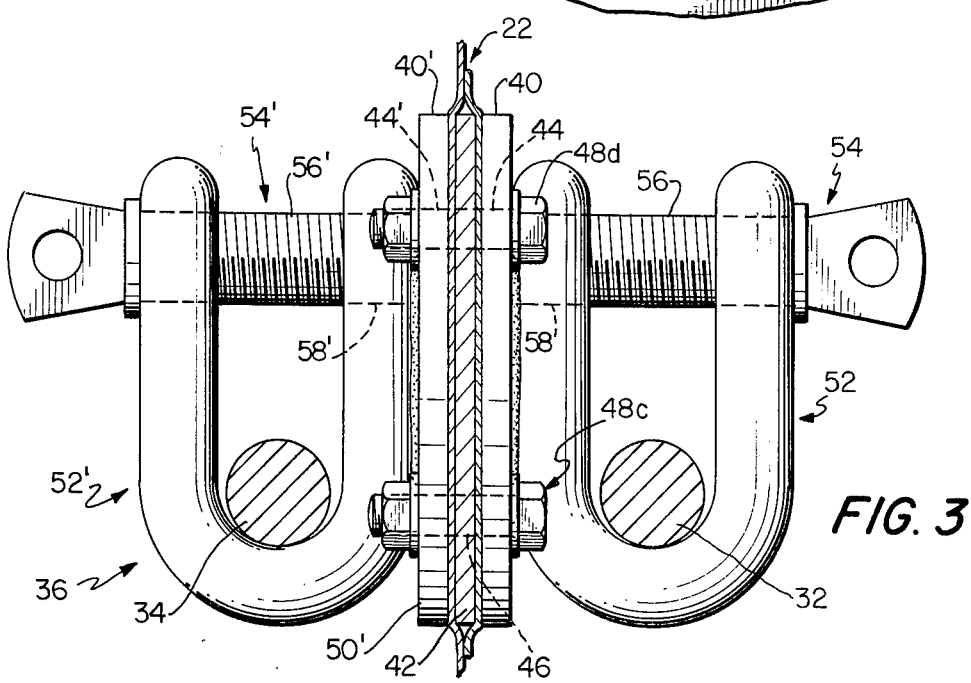
FIG. 3 is an end elevational view of the connectors shown in FIG. 2.

The connectors 36 will be described in detail in reference to FIGS. 2 and 3 of the drawing. The function of the cables is to maintain the integrity of the pollutant control booms and, as such, the cables should have tensile strengths in the order of from about 4 to 80,000 pounds. Preferably the flexible draft members 32 and 34 are provided in lengths of, for example, 25 to 50 feet and the ends of such cable lengths are connected by separable fasteners 37 having strength at least equivalent to the tensile strength of the cables themselves. Providing the pair of cables in such lenghts, speeds deployment and retrieval of the boom and also permits the cables to be opened for insertion of or removal of one or more boom sections to either enlarge or decrease the area of containment or to replace a damaged boom section.

In addition to maintaining the integrity of the containment boom, the cables are useful as attaching points for control cables and/or anchor lines as attachment to such cables puts a minimum of stress on the fabric of the boom.

From the foregoing description, it will be apparent to those skilled in the art that, if the cables or flexible draft members 32 and 34 are to perform their intended function, the means 36 connecting the cables to the boom must have provision of removal and insertion of the cables and provide for fluid tight connection to the boom skirts in a manner to distribute stresses over a substantial area. These conditions are ably met by the connectors 36 shown in FIGS. 2 and 3 of the drawing.

Each connector 36 includes a pair of rigid plates 40 and 40'. In an embodiment of the invention, the plates 40 and 40' are 5 inches in diameter by ¼ inch stainless steel.

The plates 40 and 40' are arranged in a back-to-back relationship on opposite sides of the skirt 22. In the illustrated form of the invention shown in FIGS. 2 and 3, the skirt 22 comprises a double thickness of water and oil-impervious fabric and, where such double thickness is employed, an insert plate 42 of the same size in diameter and three-sixteenth inch in thickness is positioned between the pair of fabrics comprising the skirt 22. The plates 40, 40' and 42 are bored as at 44, 44' and 46 to receive five-sixteenths stainless steel bolts, nut and washer assemblies generally designated 48a, 48b, 48c and 48d. The bolt, nut and washer assemblies 48a–48d connect the plates 40 and 40' and, where employed, 42 into a rigid assembly.

Each face 50, 50' of plates 40, 40' has secured thereto, such as by welding, a seven-eighths inch chain shackle 52, 52' respectively. The chain shackles 52, 52' include a one-inch diameter closure pin 54, 54', which closure pins are threaded as at 56 and 56' respectively and are received in threaded bores 58, 58' respectively.

In attaching the chain shackles 52, 52' to their respective plates, the shackles are oriented such that the closure pin 56, 56' are in the uppermost position so that, when the flexible draft members are placed therein, the lower U-shaped portion of each of the shackles supports the cable, chain or the like until the locking pins are inserted.

While in the illustrated form of the invention the anchor shackles 52 and 52' are shown welded to faces 50 and 50' of the respective plates 40 and 40', it will be apparent to those skilled in the art that the plate and shackle elements may be cast as a unit. Further, in the illustrated form of the invention, each plate 40 and 40' receives an anchor shackle so that a pair of cables is provided for the boom, one adjacent each face of the skirt 22. Where desired, only a single cable may be employed, in which case the anchor shackle secured plate, for example, 40' would be omitted so that only plate 40 carries an anchor shackle 52.

From the foregoing it will be seen that, with the use of the improved through boom connectors, very satisfactory support of the flexible draft members 32 and 34 is provided and further simplified means are provided for removing and inserting boom sections and all that is required to separate a boom section from the cables 32 and 34 is removal of the horizontal pins 56 and 56'. It will also be appreciated by those skilled in this art that the connectors 52 and 52' may be employed to secure other booms to the boom or to secure other flexible draft members thereto as well as providing connecting means for buoys, anchors and mooring lines as disclosed in my application Ser. No. 683,189 filed May 4, 1976.

What has been set forth above is intended as exemplary to enable those skilled in the art to practice the invention and what is new and therefore desired to be protected by Letters Patent of the United States is.

I claim:

1. A barrier for water carried pollutants comprising a series of end to end connectable boom sections, each boom section comprising a flexible tubular sleeve containing a flotation means and a depending skirt, flexible draft members extending along each side of the skirt immediately below the tubular sleeve and means connecting the flexible draft member to the skirt at spaced intervals characterized in that the connecting means comprise a pair of rigid plates, one of said pair of plates being positioned on one face of said skirt and the other of said pair of plates being positioned on the opposite face of said skirt, means rigidly joining said pair of plates through the skirt, and an anchor shackle secured to the outer face of at least one of the pair of plates, said anchor shackle being of generally U-shaped configuration and secured to the outer face of said plate with the legs of the U-shaped shackle directed upwardly to thereby receive the flexible draft member between the legs, and a closure pin releasably closing the extended ends of the legs and securing the flexible draft member to the anchor shackle.

2. The invention defined in claim 1 wherein the means rigidly joining the pair of plates through the skirt comprise a plurality of nuts and bolts and anchor shackles are secured to the outer faces of each of the plates by welding.

* * * * *